United States Patent [19]
Matubayashi et al.

[11] 3,891,503
[45] June 24, 1975

[54] METHOD FOR CULTIVATING YEASTS

[75] Inventors: Tadao Matubayashi, Ichihara; Taiichi Shiono, Chiba; Yositugu Hukuda, Ichihara; Toshio Kimura, Chiba, all of Japan

[73] Assignees: Dainippon Ink & Chemicals Inc.; Dai-Nippon Suban Manufacturing Co. Ltd., both of Tokyo, Japan

[22] Filed: Jan. 28, 1974

[30] Foreign Application Priority Data
Feb. 26, 1973 Japan............... 48-22125

[21] Appl. No.: 437,221

[52] U.S. Cl............... 195/28 R; 195/82; 195/111; 195/115
[51] Int. Cl............................................. C12b 1/00
[58] Field of Search ........... 195/28, 111, 115, 104, 195/105, 82

[56] References Cited
UNITED STATES PATENTS
3,764,474   10/1973   Watanabe et al................. 195/111
3,767,534   10/1973   Miura............................... 195/111

*Primary Examiner*—A. Louis Monacell
*Assistant Examiner*—R. B. Penland
*Attorney, Agent, or Firm*—Sherman & Shalloway

[57] ABSTRACT

A method for cultivating yeasts characterized by mix-cultivating hydrocarbon utilizable yeasts and hydrocarbon unutilizable yeasts under aerobic conditions in a medium containing hydrocarbons as a carbon source in a fermentor, recovering the yeast cells from the broth fed out of the fermentor and refreshing the residual broth with the nutrient consumed in the mix cultivation and then recycling it to the fermentor for mix cultivation.

9 Claims, No Drawings

METHOD FOR CULTIVATING YEASTS

This invention relates to a method for cultivating yeasts. More specifically, it relates to a method for cultivating yeasts wherein the culture broth remaining after recovering yeast cells therefrom (this residual broth will be called an effluent hereinbelow) is regenerated and used as a culture medium.

One example of a conventional method for cultivating yeasts in which the broth fed out of a fermentor is recycled to the fermentor is a method of cultivating hydrocarbon-utilizable yeasts in a medium containing hydrocarbons as a nutrient, in which the residual broth or effluent is recycled to the fermentor and re-used as the medium after replenishing it with the nutrient. In such a method, however, by-products containing growth inhibitors produced by the yeasts are built up in large quantities in the the medium, and the re-using of the effluent is quantitatively limited. When the above residual broth is used in large amounts, it gives rise to troubles such as the inhibition of the growth of the yeasts, or the reduction in the yields of yeast cells within a short period of time. In addition, this known method requires strict disposal of waste water in order to discard the unused residual broth safely without causing any environmental pollution.

An object of this invention is to provide a method for cultivating yeasts in which all the effluent can be reused as a culture medium without causing any such trouble as mentioned above.

Another objective of the present invention is to provide a method for cultivating yeasts capable of obtaining yeast cells efficiently without causing any pollution from polluted waste water.

According to the present invention, the above objects can be achieved by a method for cultivating yeasts characterized by mix-cultivating hydrocarbon utilizable yeasts and hydrocarbon unutilizable yeasts under aerobic conditions in a medium containing hydrocarbon as a carbon source in a fermentor, recovering the yeast cells from the broth fed out of the fermentor, and recycling the residual broth, after refreshing the nutrient consumed in the above mix cultivation, to the fermentor as the medium for the mix cultivation.

In a preferred embodiment of the method of the present invention, the fermentor is charged with an aqueous medium comprising hydrocarbons as a carbon source and as other nutrients, inorganic salts of nitrogen, phosphoric acid or potassium, magnesium and so on and, if need be, inorganic salts of iron, calcium, copper, manganese, zinc, sodium and so on, vitamins, amino acids, yeast extract and the like and at least one of hydrocarbon utilizable yeasts and at least one of hydrocarbon unutilizable yeasts are inoculated in the medium and cultivated aerobically at a pH of 3.0–6.5 and at a temperature of 25°–37°C. The broth fed out of the fermentor is subjected to centrifugal separation, for instance, to separate off the yeast cells formed by cultivation, and the effluent is refreshed with nutrients so as to have the same composition as that of the original medium and returned to the fermentor after adjusting its pH.

As the above hydrocarbons there can be used any hydrocarbon utilizable by hydrocarbon utilizable yeasts in the present invention. As suitable examples there can be mentioned n-alkanes, iso-alkanes, light oil, kerosene, liquid paraffin and so forth.

As the above hydrocarbon utilizable yeasts can be used Candida, Pichia and the like, for instance. Further, as the above hydrocarbon unutilizable yeasts, there can be used, for instance, those hydrocarbon unutilizable yeasts belonging to Saccharomyces, Rhodotorula, Trichosporon and so forth which do not utilize hydrocarbons but utilize the by-products produced by the above hydrocarbon utilizable yeasts. It is possible to alter the ratio of inoculum size between the hydrocarbon utilizable yeast and hydrocarbon unutilizable yeast within the range of 1:1 to 100:1 by weight. Thus, suitable choice of the inoculum size of hydrocarbon unutilizable yeasts makes it possible to obtain yeast cells having a high carotenoid content and a balanced portion of a vitamin content.

The method of the present invention can be put into practice by either the batch system or the continuous system. For instance, it is possible to carry out cultivation according to the present invention by continuously feeding into the fermentor at a rate corresponding to the feed out rate of the broth the medium obtained by refreshing the nutrient in the effluent, while continuously feeding the broth out of the fermentor.

In the above described present invention, C.O.D. values (chemical oxygen demand) of the effluent can remarkably be lowered and in spite of continuously repeating operations of regenerating the residual solution for reuse as medium in cultivation, yeasts can be grown normally at all times. It is also possible to increase the yields of the yeast cells based on used hydrocarbons and to cultivate yeasts on a large scale without polluting the nearby environment.

The present invention will be specifically illustrated by way of Examples.

EXAMPLE 1

In a 10l. fermentor was placed 4l. of a medium comprising 2 percent of n-hexadecane, 0.4 percent of diammonium phosphate, 0.1 percent of potassium chloride, 0.1 percent of magnesium sulfate, 0.01 percent of calcium chloride, 0.02 percent of iron sulfate, 0.01 percent of sodium chloride, 0.01 percent of yeast extract and water, and having its pH adjusted to 5.0. There were simultaneously inoculated in the aforesaid medium in the fermentor 4g (calculated in terms of dry cells) of Candida tropicalis precultured in a medium having the same composition as the above and 0.4 g (calculated in terms of dry cells) of Trichosporan pullulans pre-cultured in a medium comprising 2 percent of glucose, 1 percent of yeast extract, 1 percent of malt extract and water, which were cultivated aerobically with stirring at a temperature of 33°C. and a rate of 1,000 r.p.m. during a period of 18 hours, while adjusting the pH to 5.0 using 24 percent aqueous ammonia.

After the cultivation, the broth was centrifuged to separate off the yeast cells. The separated cells were washed with water and dried for the measurement of their weight and at the same time, with regard to the effluent, its C.O.D. value was measured using a COD-chrome method (JIS-K-0102). After that, 0.8 l. of water and nutrient consumed in the previous cultivation were added to 3.2 l. of this effluent so that the medium with the above composition could be formed. This was used as medium and yeasts were once again cultivated at the same conditions. Thereafter, similar operations were repeated to conduct cultivations recyclically five times The results are tabulated in the following Table 1 and Table 2.

COMPARATIVE EXAMPLE 1

Pure cultivation of Candida tropicalis was conducted under the same conditions as in Example 1. Its result are tabulated in the following Table 1 and Table 2.

Table 1

| Number of cultivations performed recyclically | Dry Cell Weight | | | |
|---|---|---|---|---|
| | Mix cultivation | | Pure cultivation | |
| | Dry cell weight (g/4l) | Yield based on hydro-carbon (%) | Dry cell weight (g/4l) | Yield based on hydro-carbon (%) |
| 0 | 90.7 | 113.4 | 73.9 | 92.4 |
| 1 | 90.3 | 112.9 | 73.5 | 91.9 |
| 2 | 90.8 | 113.5 | 72.1 | 90.1 |
| 3 | 91.2 | 114.0 | 69.8 | 87.3 |
| 4 | 91.5 | 114.8 | 65.0 | 81.3 |
| 5 | 91.3 | 114.4 | 60.3 | 75.4 |

Table 2

| Number of recycle cultivations | C.O.D. Values | |
|---|---|---|
| | Mix cultivation (ppm) | Pure cultivation (ppm) |
| 0 | 930 | 5220 |
| 1 | 1020 | 7410 |
| 2 | 1080 | 8590 |
| 3 | 1110 | 9400 |
| 4 | 1130 | 9930 |
| 5 | 1130 | 10150 |

EXAMPLE 2

40 l. of a medium having the same composition as in Example 1 was adjusted to a pH of 5.0 with hydrochloric acid and then placed in a 100 l. fermentor. After that, there were inoculated in the medium 40g (calculated in terms of dry cells) of Candida tropicalis pre-cultured in the medium having the same composition as the above and 40g (calculated in terms of dry cells) of Trichosporon pullulans pre-cultured in the medium comprising 2 percent of glucose, 1 percent of yeast extract, 1 percent of malt extract and water, which were cultivated with stirring at a temperature of 33°C. and at a rate of 500 r.p.m. while adjusting the pH to 5.0 using 24 percent aqueous ammonia. 13 hours after the cultivation was begun (when the yeast concentration reached 1.7%), the cultivation was switched over to continuous cultivation and after another 50 hours (63 hours after the cultivation was begun) recyclic cultivation was carried out in which the effluent was refreshed and reused as medium.

The recycle cultivation was put into practice according to the divisions shown in the following Table 3. In the recycle cultivations at the first to sixth times, there was continuously recyled to the fermentor as medium a mixture obtained by adding water to the effluent in the preceding cultivation division in a proportion of 3 to 7 and further refreshing the nutrient consumed in the preceding cultivation division. By "recycle cultivation at the zero time" referred to in Table 3 is meant that cultivation was conducted by feeding the fermentor with a newly separately prepared medium with the same composition without feeding the fermentor with the medium obtained by refreshing the effluent in the preceding cultivation division in such a way as aforesaid (that applies to the following Examples as well).

Table 3

| Cultivation time (hr.) | Cultivation divisions |
|---|---|
| 0 – 13 | (non-continuous cultivation) |
| 13 – 63 | recyclic cultivation at the zero time (continuous cultivation) |
| 63 – 99 | recyclic cultivation at the first time (do.) |
| 99 – 135 | recyclic cultivation at the second time (do.) |
| 135 – 171 | recyclic cultivation at the third time (do.) |
| 171 – 207 | recyclic cultivation at the fourth time (do.) |
| 207 – 243 | recyclic cultivation at the fifth time (do.) |
| 243 – 279 | recyclic cultivation at the sixth time (do.) |
| 279 – 315 | recyclic cultivation at the zero time (do.) |

In the respective cultivation divisions, the feed out volume of the broth and feed in volume of the medium were set as 7,200 ml per hour, respectively.

Part of the broth fed out in each of the cultivation divisions was taken out to plate culture in a medium comprising 2 percent of glucose, 1 percent of yeast extract, 1 percent of malt extract, 2 percent of powdered agar and water and a proportion of hydrocarbon unutilizable yeasts accounted for in the total yeasts was measured from the configuration of the colony that occurred. The remaining part of the fed out broth was centrifuged to separate and recover the yeast cells. The yeast cells so obtained were washed with water and dried to measure their weight. C.O.D. values were measured according to COD-chrome method (JIS-K-0102) using part of the effluent.

Table 4

| Lapse of time in cultivation at the time of measurement (hr) | Cultivation divisions | Dry cell weight (g/l) | Hydrocarbon unutiliza-ble yeast (%) | C.O.D. (ppm) |
|---|---|---|---|---|
| 40 | Recyclic cultivation at the zero time | 20.2 | — | — |
| 60 | | 20.4 | 18 | 820 |
| 80 | Recyclic cultivation at the first time | 20.3 | — | — |
| 95 | | 20.4 | 23 | 1390 |
| 110 | Recyclic cultivation at the second time | 20.4 | — | — |
| 130 | | 20.4 | 26 | 1790 |
| 150 | Recyclic cultivation at the third time | 20.4 | — | — |
| 170 | | 20.4 | 28 | 2070 |

Table 4 —Continued

| Lapse of time in cultivation at the time of measurement (hr) | Cultivation divisions | Dry cell weight (g/l) | Hydrocarbon unutilizable yeast (%) | C.O.D. (ppm) |
|---|---|---|---|---|
| 185 | | 20.4 | — | — |
| | Recyclic cultivation at the forth time | | | |
| 205 | | 20.4 | 30 | 2270 |
| 220 | | 20.4 | — | — |
| | Recyclic cultivation at the fifth time | | | |
| 240 | | 20.4 | 31 | 2410 |
| 260 | | 20.4 | — | — |
| | Recyclic cultivation at the sixth time | | | |
| 275 | | 20.4 | 32 | 2510 |
| 290 | | 20.4 | — | — |
| | Recyclic cultivation at the zero time | | | |
| 315 | | 20.4 | 24 | 830 |

COMPARATIVE EXAMPLE 2:

Pure cultivation of Candida tropicalis was conducted under the same cultivation conditions as in Example 2 except following the cultivation divisions shown in Table 5. Seventeen hours after cultivation was begun, when the yeast concentration reached 1.7 percent, the cultivation was switched over to continuous cultivation and after that, cultivation was conducted according to the respective divisions as mentioned below.

Table 5

| Cultivation time (hr.) | Cultivation divisions |
|---|---|
| 0–17 | (non-continuous cultivation) |
| 17–67 | Recyclic cultivation at the zero time (continuous cultivation) |
| 67–113 | Recyclic cultivation at the first time (do.) |
| 113–149 | Recyclic cultivation at the second time (do.) |
| 149–185 | Recyclic cultivation at the third time (do.) |
| 185–221 | Recyclic cultivation at the fourth time (do.) |
| 221–257 | Recyclic cultivation at the fifth time (do.) |
| 257–293 | Recyclic cultivation at the zero time (do.) |

The results are tabulated in Table 6.

Table 6

| Lapse of time in cultivation at the time of measurement (hr.) | Cultivation divisions | Dry cell weight (g/l) | C.O.D. (ppm) |
|---|---|---|---|
| 35 | | 16.6 | — |
| | Recyclic cultivation at the zero time | | |
| 60 | | 16.4 | 4210 |
| 80 | | 16.3 | — |
| | Recyclic cultivation at the first time | | |
| 100 | | 16.4 | 7140 |
| 123 | | 16.4 | — |
| | Recyclic cultivation at the second time | | |
| 135 | | 16.3 | 9200 |
| 160 | | 16.0 | — |
| | Recyclic cultivation at the third time | | |
| 170 | | 16.0 | 10640 |
| 195 | | 14.9 | — |
| | Recyclic cultivation at the fourth time | | |
| 210 | | 15.0 | 11250 |

Table 6

| Lapse of time in cultivation at the time of measurement (hr.) | Cultivation divisions | Dry cell weight (g/l) | C.O.D. (ppm) |
|---|---|---|---|
| 225 | | 13.9 | — |
| | Recyclic cultivation at the fifth time | | |
| 245 | | 13.2 | 11370 |
| 280 | | 15.2 | — |
| | Recyclic cultivation at the zero time | | |
| 290 | | 15.2 | 4050 |

In this cultivation it was seen that as the number of recyclings increased, C.O.D. values rapidly increased and that in inverse proportion thereto, the yeast concentration decreased. Particularly from the recyclic cultivation at the fourth time onward in which the C.O.D. value was in excess of 10,000 ppm, the yeast concentration was remarkably lowered and in the recyclic cultivation at the fifth time, it was finally impossible to achieve the steady state. Whereupon, the instant cultivation system was once again returned to the same conditions under which recyclic cultivation at the first zero time was conducted and in consequence of this, the yeast concentration showed a tendency toward returning to the original, and 32 hours later the steady state could be achieved. The yeast concentration, however, was not returned to the original.

EXAMPLE 3:

Candida tropicalis and Trichosporon pullulans were continuously cultured under the same cultivation conditions as as in Example 2 except following the conditions shown in Table 7.

Table 7

| Cultivation time (hr.) | Cultivation divisions |
|---|---|
| 0 – 13 | (non-continuous cultivation) |
| 13 – 63 | Recyclic cultivation at the zero time (continuous cultivation) |
| 63 – 99 | Recyclic cultivation at the first time (do.) |
| 99 – 135 | Recyclic cultivation at the second (do.) |
| 135 – 171 | Recyclic cultivation at the third time (do.) |

(Note) Recyclic cultivations at the first-third times were conducted by continuously recycling as medium a mixture obtained by adding water to the effluent in the preceding cultivation division in a proportion of 1

Table 10

| Lapse of time in cultivation at the time of measurement (hr.) | Cultivation divisions | Dry cell weight (g/l) | Hydrocarbon unutilizable yeast (%) | C.O.D. (ppm) |
| --- | --- | --- | --- | --- |
| 60 | Recyclic cultivation at the zero time | 18.7 | 10 | 1300 |
| 100 | Recyclic cultivation at the first time | 18.8 | 12 | 2100 |
| 135 | Recyclic cultivation at the second time | 18.8 | 13 | 2700 |
| 170 | Recyclic cultivation at the third time | 18.6 | 13 | 3200 | to 9 and further refreshing each type of nutrient consumed in the preceding cultivation division.

The results are tabulated in Table 8.

Table 8

| Lapse of time in cultivation at the time of measurement (hr.) | Cultivation divisions | Dry cell weight (g/l) | Hydrocarbon unutilizable yeast (%) | C.O.D. (ppm) |
| --- | --- | --- | --- | --- |
| 60 | Recyclic cultivation at the zero time | 20.2 | 19 | 820 |
| 95 | Recyclic cultivation at the first time | 20.5 | 22 | 1560 |
| 130 | Recyclic cultivation at the second time | 20.3 | 25 | 2240 |
| 170 | Recyclic cultivation at the third time | 20.1 | 29 | 2440 |

EXAMPLE 4

Candida tropicalis and Saccharomyces cerevisiae were continuously cultured under the same cultivation conditions as in Example 2 except following the conditions shown in Table 9.

Table 9

| Cultivation time (hr.) | Cultivation divisions |
| --- | --- |
| 0 – 14 | (non-continuous cultivation) |
| 14 – 64 | Recyclic cultivation at the zero time (continuous cultivation) |
| 64 – 100 | Recyclic cultivation at the first time (do.) |
| 100 – 136 | Recyclic cultivation at the second time (do.) |
| 136 – 172 | Recyclic cultivation at the third time (do.) |

EXAMPLE 5

Pichia miso and Trichosporon pullulans were continuously cultured under the same cultivation conditions as in Example 2 except following the conditions shown in Table 11.

Table 11

| Cultivation time (hr.) | Cultivation divisions |
| --- | --- |
| 0 – 16 | (non-continuous cultivation) |
| 16 – 69 | Recyclic cultivation at the zero time (continuous cultivation) |
| 69 – 105 | Recyclic cultivation at the first time (do.) |
| 105 – 141 | Recyclic cultivation at the second time (do.) |
| 141 – 177 | Recyclic cultivation at the third time (do.) |
| 177 – 213 | Recyclic cultivation at the fourth time (do.) |

(note): The feed out volume of the broth and feed in volume of the medium were set as 6400 ml. per hour, respectively.

The results are tabulated in Table 12.

Table 12

| Lapse of time in cultivation at the time of measurement (hr.) | Cultivation divisions | Dry cell weight (g/l) | Hydrocarbon unutilizable yeast (%) | C.O.D. (ppm) |
| --- | --- | --- | --- | --- |
| 60 | Recyclic cultivation at the zero time | 19.3 | 10 | 1100 |
| 100 | Recyclic cultivation at the first time | 19.0 | 12 | 1900 |
| 140 | Recyclic cultivation at the second time | 19.2 | 13 | 2400 |
| 170 | Recyclic cultivation at the third time | 19.1 | 13 | 2800 |
| 210 | Recyclic cultivation at the fourth time | 19.1 | 14 | 8000 |

COMPARATIVE EXAMPLE 3:

Pure cultivation of Pichia miso was conducted under the same cultivation conditions as in Example 5 except following the conditions shown in Table 13.
The results are tabulated in Table 14.

Table 13

| Cultivation time (hr.) | Cultivation divisions |
|---|---|
| 0 – 19 | (non-continuous cultivation) |
| 19 – 69 | Recyclic cultivation at the zero time (continuous cultivation) |
| 69 – 105 | Recyclic cultivation at the first time (do.) |
| 105 – 141 | Recyclic cultivation at the second time (do.) |
| 141 – 177 | Recyclic cultivation at the third time (do.) |
| 177 – 213 | Recyclic cultivation at the fourth time (do.) |

Table 14

| Lapse of time in cultivation at the time of measurement (hr.) | Cultivation divisions | Dry cell weight (g/l) | C.O.D. (ppm) |
|---|---|---|---|
| 50 | Recyclic cultivation at the zero time | 17.8 | — |
| 69 | | 17.9 | 3900 |
| 85 | Recyclic cultivation at the first time | 17.3 | — |
| 105 | | 17.2 | 6600 |
| 121 | Recyclic cultivation at the second time | 16.7 | — |
| 141 | | 16.5 | 8500 |
| 157 | Recyclic cultivation at the third time | 15.0 | — |
| 177 | | 14.6 | 9600 |
| 193 | Recyclic cultivation at the fourth time | 13.7 | — |
| 213 | | 13.1 | 10200 |

EXAMPLE 6:

Candida tropicalis and Rhodotorula aurantiaca were continuously cultured under the same cultivation conditions as in Example 4. Table 15 is indicative of the results obtained.

Table 15

| Lapse of time in cultivation at the time of measurement (hr.) | Cultivation divisions | Dry cell weight (g/l) | Hydrocarbon unutilizable yeast (%) | C.O.D. (ppm) |
|---|---|---|---|---|
| 60 | Recyclic cultivation at the zero time | 19.4 | 16 | 1050 |
| 95 | Recyclic cultivation at the first time | 19.7 | 18 | 1780 |
| 135 | Recyclic cultivation at the second time | 19.8 | 18 | 2290 |
| 170 | Recyclic cultivation at the third time | 19.8 | 18 | 2550 |

What is claimed is:

1. A method for cultivating yeasts comprising mix-cultivating hydrocarbon utilizable yeasts and hydrocarbon unutilizable yeasts under aerobic conditions in a medium containing hydrocarbons as a carbon source in a fermentor, recovering the yeast cells from the broth fed out of the fermentor and refreshing the residual broth with the nutrient consumed in the mix cultivation and then recycling the refreshed residual broth to the fermentor for mix cultivation.

2. A method according to claim 1 in which the ratio between hydrocarbon utilizable yeasts and hydrocarbon unutilizable yeasts used is in a range of 1:1 to 100:1.

3. A method for mix-cultivating hydrocarbon utilizable yeasts and hydrocarbon unutilizable yeasts under aerobic conditions in a medium containing hydrocarbon as a carbon source in a fermentor, comprising carrying out said mix cultivation by continously feeding the broth out of the fermentor, while continuously feeding a fresh medium into the fermentor in a proportion corresponding to the feed out rate of said broth, said fresh medium being obtained by refreshing with the nutrient the residual liquid remaining after the recovery of the yeast cells from the fed-out broth.

4. The method of claim 3 wherein said medium further contains additional nutrients selected from inorganic salts of nitrogen, potassium, magnesium, iron, calcium, copper, manganese, zinc and sodium inorganic salts of phosphorus and or mixtures of said inorganic salts, vitamin, amino acids, or yeast extract.

5. The method of claim 3 in which the ratio between hydrocarbon utilizable yeasts and hydrocarbon unutilizable yeasts used is in the range of 1:1 to 100:1.

6. The method of claim 3 wherein said mixed cultivation is conducted at a pH of 3.0–6.5 and at a temperature of 25°–37°C.

7. The method of claim 1 wherein the hydrocarbon is selected from n-alkanes, iso-alkanes, light oil, kerosene, and liquid paraffin.

8. The method of claim 3 wherein the hydrocarbon is selected from n-alkanes, iso-alkanes, light oil, kerosene, and liquid paraffin.

9. The method of claim 3 wherein said medium contains n-hexadecane, diammonium phosphate, potassium chloride, magnesium sulfate, calcium chloride, iron sulfate, sodium chloride, yeast extract and water, and wherein said hydrocarbon unutilizable yeast is pre-cultured in a medium comprising glucose, yeast extract, malt extract and water.

* * * * *

UNITED STATES PATENT OFFICE
CERTIFICATE OF CORRECTION

Patent No. 3,891,503          Dated June 24, 1975

Inventor(s) Matubayashi, et al.

It is certified that error appears in the above-identified patent and that said Letters Patent are hereby corrected as shown below:

Page 1, left-hand column, Item [73], delete "Suban", and insert -- Sugar --

Signed and Sealed this fourth Day of November 1975

[SEAL]

Attest:

RUTH C. MASON
*Attesting Officer*

C. MARSHALL DANN
*Commissioner of Patents and Trademarks*